(12) United States Patent
Offermann et al.

(10) Patent No.: US 6,280,814 B1
(45) Date of Patent: Aug. 28, 2001

(54) MULTILAYERED SHEET INSULATING MATERIAL FOR HEAT INSULATION AND SOUND PROOFING

(75) Inventors: Peter Offermann, Liegau-Augustusbad; Gerald Hoffmann, Wilsdruff; Christiane Freudenberg, Weixdorf, all of (DE); Ludmila Lobova; Evgueni Berschev, both of St. Petersburg (RU)

(73) Assignee: Technische Universitaet Dresden, Dresden (DE)

( * ) Notice: Subject to any disclaimer, the term of this patent is extended or adjusted under 35 U.S.C. 154(b) by 0 days.

(21) Appl. No.: 09/242,583
(22) PCT Filed: Aug. 29, 1997
(86) PCT No.: PCT/DE97/01901
  § 371 Date: Jun. 29, 1999
  § 102(e) Date: Jun. 29, 1999
(87) PCT Pub. No.: WO98/09109
  PCT Pub. Date: Mar. 5, 1998

(30) Foreign Application Priority Data

Aug. 30, 1996 (DE) ............................................ 196 35 214

(51) Int. Cl.[7] ......................................................... B32B 1/06
(52) U.S. Cl. ............................ 428/69; 428/120; 428/137
(58) Field of Search ................................ 428/69, 120, 68, 428/76, 137; 52/791.1, 794.1, 783.1

(56) References Cited

U.S. PATENT DOCUMENTS

| | | | |
|---|---|---|---|
| 3,936,553 | * 2/1976 | Rowe | 428/69 |
| 4,409,271 | * 10/1983 | Pehr | 428/69 |
| 5,595,806 | * 1/1997 | Korfmacher | 428/69 |

FOREIGN PATENT DOCUMENTS

| | | |
|---|---|---|
| 243075 | 11/1987 | (CS) . |
| 3507323 | 9/1985 | (DE) . |
| 3532663 | 3/1987 | (DE) . |
| 3900311 | 7/1990 | (DE) . |
| 4003770 | 8/1991 | (DE) . |

* cited by examiner

Primary Examiner—Alexander S. Thomas
(74) Attorney, Agent, or Firm—Jordan and Hamburg LLP

(57) ABSTRACT

Multilayered sheet insulating material for heat insulation and sound proofing having at least two separation layers made of flexible material, such as sheets, non-woven fabric, paper or the like, and spacer elements between the separation layers. The spacer elements are formed by spacer fibers which are oriented perpendicular to the separation layers, and at least one end of the spacer fibers is linked, e.g., by adhesive, to a separation layer. The sheet insulating material also includes supporting fibers arranged between the separation layers and proximate the spacer fibers for supporting the spacer fibers. The sheet insulating material has very good insulating properties, a particularly low weight and high flexibility.

22 Claims, 2 Drawing Sheets

MULTILAYERED SHEET INSULATING MATERIAL FOR HEAT INSULATION AND SOUND PROOFING

FIELD OF THE INVENTION

The invention relates to a multilayered sheet insulating material for heat insulation and sound proofing including at least two separation layers made of a flexible material and spacer elements between the separation layers. The insulating material is designated for use as heat-insulating and sound-proofing material in technology (e.g. construction of cars or vehicles, aerospace engineering) and in civil engineering.

BACKGROUND OF THE INVENTION

Insulating materials are multicomponent systems whose structure is known to be composed of solid particles and gas volumes. Due to the favorable design and arrangement of these components in the cross section, the insulating effect is generated by small gas occlusions. It is known that the effective thermal conductivity of a material consists of the heat conduction of the solid matter and the effective thermal conductivity of the occluded gas. This results from the shares of the apparent thermal conductivities caused by convection and radiation within the structure and the proper thermal conductivity of the gas.

It is known that the superinsulating materials can be constructed as a layer structure. The layers are formed by thin metal plates—mostly steel—or aluminum plates or by metallized sheets. To prevent the layers from contacting one another, there are inserted spacers which are more or less insulating. These structures can be evacuated if certain demands are met.

Vacuum insulations are mostly used as panels or components, less as large-area materials, since the labor and material expenditure is very high in the course of production.

From DE-OS 39 00 311 A1 there is known a multilayered evacuated structure. Several thin steel sheets are permanently connected with each other by supports with low thermal conductivity using a suitable adhesive. By placing thin fibres or foamed plastic in the space, the radiation losses are reduced. By the position of the fibres parallel to the steel sheets, large contact surfaces are created which increase the thermal bridges and raise the heat losses. Plastic materials or steel are used as supports. Disadvantages of this structure are its stiffness, i.e. no flexibility, and its high weight.

In DE-OS 40 03 770 A1 a heat-insulating encasement for a technical plant is shown. By profiling the aluminum foils, (i.e., forming a cross-section of the aluminum foils into a non-planar shape, which is similar and comparable to corrugating or stamping), the aluminum foils form heat-insulating pockets. In the heat-insulating mat according to DE-OS 35 07 323, metal-coated sheets are directly connected with each other by short weld seams. In the spaces, there are inserted expanding elements which are required for the insulating effect. A disadvantage of these inventions is that a direct contact between the individual sheets is created. This promotes the heat conduction within the foils. These structures are hard and not flexible. Relatively stiff sheets of heavy weight are required for the profiling.

When sheets are used in the structure, the spacing is generated by the filling-in of fibres lying parallel with the sheet by means of ceramic particles or supports of glass-fibre paper. The invention according to DE-OS 35 32 663 A1 describes a soft superinsulation in which links that are incorporated according to a specific geometry provide the spacing of the metallized sheets. In CS 24 30 75 an insulating material is presented in which a non-woven fabric consisting of polyester fibres and/or polypropylene fibres is covered with a metallized sheet. These non-woven fabrics, which are coated with a non-metallized sheet, can be twice doubled and bonded at a specific pressure. This requires great energy expenditure. In all structures, the contact surfaces between the spacers and the sheets are relatively large, because the fibres contact the sheets with their length.

Therefore, heat losses due to heat conduction can be expected.

OBJECTS AND SUMMARY OF THE INVENTION

It is an object of the invention to provide an insulating material with an extremely high insulating effect at low weight, slight thickness and high flexibility. Attention should be paid to economical and ecological aspects.

Another object of the invention is to produce a superlight structure with a saving of material, i.e., which requires less material than conventional multilayered sheet insulating materials.

Additional objects of the invention are to provide a multilayered sheet insulating material with economies of production expenditure, reduction of waste and lowering of transportation costs, mainly in the use of means of transport.

In order to achieve these objects and others, a multilayered sheet insulating material for heat insulation and sound proofing in accord with the invention comprises at least two separation layers made of a flexible material and single and self-supporting spacer fibres arranged between the separation layers. The spacer fibres are oriented perpendicular to the separation layers and each separation layer is linked to ends of some spacer fibres at least on one side. The perpendicular orientation of the spacer fibres is retained over their whole length as well as at the connection spot. The insulating material also includes supporting fibres arranged between the separation layers and proximate the spacer fibres for supporting the spacer fibres. The supporting fibres are shorter than the spacer fibres. The supporting fibres may be arranged between and/or parallel with the spacer fibres. An adhesive agent may be provided for linking the separation layers with the ends of the spacer fibres and the supporting fibres.

The layer structure perpendicular to the heat flow results from layer-forming parallel separation layers with a spacing of 0.5 mm to 5 mm. According to the invention, perpendicularly oriented spacer fibres are used to ensure the defined distances. The number of layers is dependent on the application and, accordingly, on the required insulating efficiency.

According to the demands, thin plane membranes with a low radiation coefficient are used as layer-forming elements or separation layers. In this way, the shares of the apparent thermal conductivities due to convection and radiation are minimized. Especially preferred membranes are polyester sheets in the range of 2 to 20 $\mu$m, also perforated ones. They may be coated with aluminum on one side or two sides. There may also be used other membranes such as non-woven fabrics, thin plates or sheets of ceramic material, cellulose and others with or without a metal coating.

In principle, all fibrous materials (e.g. polyamide, polypropylene, viscose, aramid, glass, carbon fibres) 0.5 to 5 mm in length and with a minimum fineness of 0.5 tex may be used as spacer fibres.

The fibres are advantageously arranged parallel to one another in a group and oriented perpendicular to the sheet. By the defined arrangement of the fibres cut to a specific length on the membrane, a constant spacing of the separation layers is achieved. The geometrical arrangement of the spacer fibres on the membrane can be stochastic at points or defined, as a lattice structure or an annular structure. In this way, the contact surface and, thus, the heat losses caused by heat conduction can be minimized. The dimensions are to be designed to prevent contacting among the membranes after doubling. For doubling, the following variants can be distinguished:

1. The separation layers are arranged in a defined way during any doubling, so that the spacer fibres will be superimposed exactly, partially or not at all.

2. The separation layers are stochastically arranged during any doubling, so that the position of the spacer fibres cannot be described exactly.

The advantage of the multilayered sheet insulating material according to the invention is that by upright fibres, a stable supporting function of the flexible separation layers is achieved. As related to the overall weight, the fibres only have a low percentage by weight. Due to the small contact surface of the fibre ends with the separation layers, an extraordinarily large heat insulation is achieved.

Other details and advantages will now be explained in greater detail with reference to embodiments thereof.

DETAILED DESCRIPTION OF THE INVENTION

First, the embodiment will now illustrate an example of the production of an insulating material, and then an insulating material produced in such a way will be described in greater detail.

The production of the insulating material may be based on a continuously or intermittently operating process principle. It is produced in such a way that the separation layer is coated with the binding agent on one side or two sides. According to the geometry of the applied adhesive (FIG. 3), there is operated with rotary screen printing, stencil and squeegee or printing roller, or on the whole surface using an adequate technology.

Figure 3A:
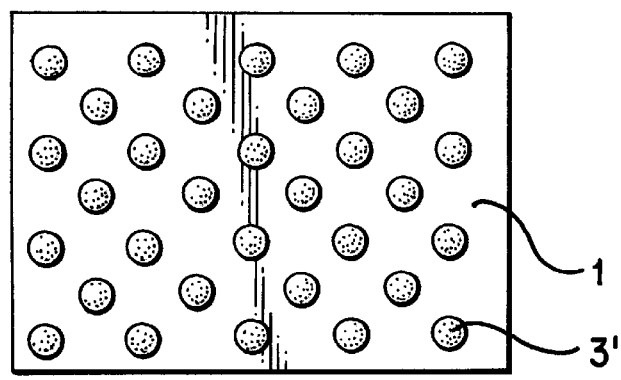
FIG. 3a is an example of a point array of the adhesive.
Figure 3B:
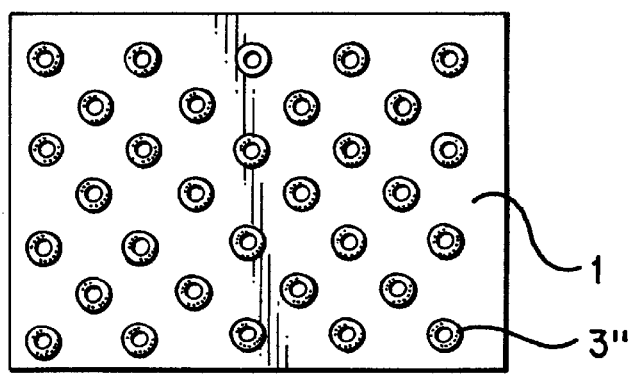
FIG. 3b is as FIG. 3a, but with annular adhesive spots.
Figure 3C:
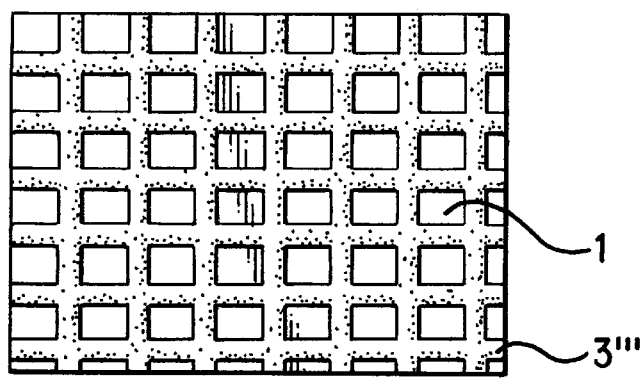
FIG. 3c is an example of a latticed arrangement of the adhesive.

FIG. 3a shows the array of the adhesive 3' according to a geometry of points. The distances between the points are approximately constant in all directions. In FIG. 3b, the adhesive spots have the shape of rings 3". Thus, the spacer fibres are arranged on the membrane in a ring-shaped geometry. An advantage is the enlargement of the supporting surface with the same contact area and thereby the improvement of the geometry of support and the reduction of heat losses. FIG. 3c represents the application of adhesive 3'" according to a lattice structure.

The chemically pretreated fibres are electrically charged in an electric field. In this field, the fibres align themselves with the field lines in the z-direction, and perpendicularly oriented and parallel to one another, they preferably get to the adhesive spots on the plane separation layer lying in the xy-direction.

The perpendicular orientation is retained in the adhesive bed. Setting takes place in the following drying process. The membrane with spacer fibres on top of it can be reeled or put down as piece goods. It is thereby made available for further processing (e.g. doubling). The required insulating effect is achieved by producing an insulating element (e.g. a panel). For that, the membranes must be cut to a specific size, stacked and, possibly, connected with each other. Another possibility of achieving the insulating effect consists in the wrapping of the part to be insulated. The production provides several possible variations of the adaptation to the chosen materials and of the product-specific demands. This concerns, e.g., the regulation of the field strength, the fibrous material, the length and fineness of the fibre, the fibre coating density, the manufacturing rate and the take-up force.

Figure 1:
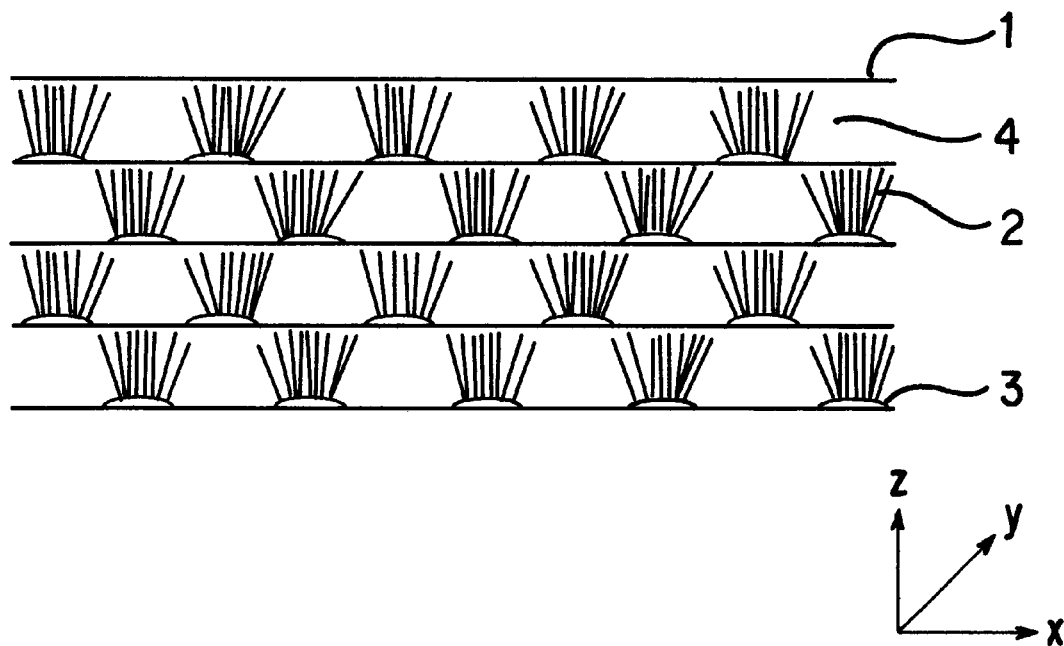
FIG. 1 is a section through a multilayered sheet insulating material according to the invention.

A sectional view of a corresponding insulating material according to the invention is presented in FIG. 1. The insulating material has five separation layers 1 in the z-direction. In the x-y direction, fibre bundles with an even distribution 2 are provided. One end of the fibres 2 is linked to the separation layer 1 by an adhesive 3. At the other end of the fibres, the separation layer is supported or sits close. The separation layer 1 consists of a polyester sheet coated with aluminum on both sides. The insulating layer has such a structure that the ends of the fibres 2 sit close to those spots of the separation layer 1 which are left free of fibre bundles on the opposite side.

Figure 2:
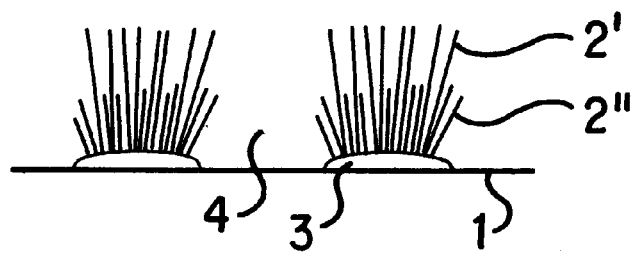
FIG. 2 is a detail drawing belonging to FIG. 1.

According to the representation in FIG. 2, the fibre bundles consist of spacer fibres 2' and supporting fibres 2". The spacer fibres 2' are longer than the supporting fibres 2". The use of fibres having different lengths allows the reduction of the conduction through solid particles. The shorter fibres (supporting fibres) support the spacer fibres.

By the use of hollow and profiled fibres, the heat conduction through the solid particles is reduced further. At the same time, the mechanical load capacity is increased, since hollow fibres, e.g., can support greater bending moments than conventional fibres. Hollow fibres and profiled fibres describe the shape of the fibres. Hollow fibres have a hole in them while profiled fibres have a profiled surface.

The heat loss of the structure can be reduced by the use of fibrous materials with low thermal conductivity.

As gases between the sheets in this structure, i.e., in the space 4, there can be used air, inert or insulating gases.

The insulating effect is increased by evacuation. By means of the spacer fibres according to a certain geometry, it is ensured that no contacts between the sheets can occur due to air pressure up to $1 \cdot 10^5$ Pa (normal air pressure). The separation layer 1 and the spacer fibres 2', if required according to the invention also the supporting fibres 2", are connected by a binding agent to form adhesive spots 3. The adhesive spots 3 are applied dependent on the geometry. When low-melting materials are used, the separation layer, the spacer fibres 2' and the supporting fibres 2" can be connected with each other by formed fused spots.

The individual sheets with the perpendicularly oriented fibres 2 can be connected with each other by means of adhesive bonding, fusing or stitch bonding.

What is claimed is:

1. A multilayered sheet insulating material for heat insulation and sound proofing comprising:

at least two separation layers made of a flexible material;

single and self-supporting spacer fibres arranged between said separation layers, said spacer fibres being oriented perpendicular to said separation layers, each separation layer being linked to ends of some of said spacer fibres at least on one side and the perpendicular orientation of said spacer fibres being retained over their entire length as well as at the connection spot; and supporting fibres arranged between said separation layers and proximate said spacer fibres for supporting said spacer fibres, said supporting fibres being shorter than said spacer fibres and connected at one end to one of said separation layers.

2. The multilayered sheet insulating material as claimed in claim 1, wherein at least one of said separation layers is polyester and has a thickness from 2 to 20 μm, said at least one separation layer being coated with metal on at least one side.

3. The multilayered sheet insulating material as claimed in claim 1 or 2, wherein said spacer fibres have a length from 0.5 to 5 mm.

4. The multilayered sheet insulating material as claimed in claim 1 or 2, wherein said spacer fibres are chemically pretreated.

5. The multilayered sheet insulating material as claimed in claim 1 or 2, wherein said spacer fibres are hollow.

6. The multilayered sheet insulating material as claimed in claim 1 or 2, wherein said supporting fibres are arranged between and parallel with said spacer fibres.

7. The multilayered sheet insulating material as claimed in claim 1, wherein said spacer fibres and said supporting fibres are stochastically distributed in the interface between said at least two separation layers.

8. The multilayered sheet insulating material as claimed in claim 1, wherein said spacer fibres and said supporting fibres between said separation layers are arranged in groups.

9. The multilayered sheet insulating material as claimed in claim 1, further comprising an adhesive agent for linking said separation layers with the ends of said spacer fibres and said supporting fibres.

10. The multilayered sheet insulating material as claimed in claim 1, wherein said separation layers are connected with said spacer fibres and said supporting fibres by fused spots at junctions of said spacer fibres and said supporting fibres with said separation layers.

11. The multilayered sheet insulating material as claimed in claim 1, wherein said separation layers are superimposed in the z-direction.

12. The multilayered sheet insulating material as claimed in claim 1, wherein both ends of said spacer fibres are fixed to said separation layers.

13. The multilayered sheet insulating material as claimed in claim 1, wherein a space between said separation layers is evacuated and said separation layers are kept apart a distance.

14. The multilayered sheet insulating material as claimed in claim 1, further comprising an inert or insulating gas filling a space between said separation layers.

15. The multilayered sheet insulating material as claimed in claim 1, 13 or 14, wherein said separation layers have perforations.

16. The multilayered sheet insulating material as claimed in claim 1, wherein at least one of said separation layers is coated with aluminum.

17. The multilayered sheet insulating material as claimed in claim 1, wherein at least one of said separation layers is coated with metal on both sides.

18. The multilayered sheet insulating material as claimed in claim 1, wherein said spacer fibres are selected from the group consisting of polyamide, polypropylene, viscose, aramid, glass and carbon fibres.

19. The multilayered sheet insulating material as claimed in claim 1, wherein said spacer fibres and said supporting fibres between said separation layers are arranged in a dotted pattern.

20. The multilayered sheet insulating material as claimed in claim 1, wherein said spacer fibres and said supporting fibres between said separation layers are arranged in a latticed pattern.

21. The multilayered sheet insulating material as claimed in claim 1, wherein said spacer fibres and said supporting fibres between said separation layers are arranged in a ring-shaped pattern.

22. The multilayered sheet insulating material for heat insulation and sound proofing comprising:

at least first and second separation layers made of a flexible material, each of said first and second separation layers having an upper and lower surface whereby said upper surface of said first separation layer faces said lower surface of said second separation layer;

spacer fibres adhesively bonded to said upper surface of said first separation layer and extending in a direction perpendicular to said first separation layer and toward said second separation layer such that said spacer fibres are close to or contact said lower surface of said second separation layer, said spacer fibres supporting said second separation layer at a distance from said first separation layer; and supporting fibres attached to said upper surface of said first separation layer and proximate said spacer fibres for supporting said spacer fibres, said supporting fibres being shorter than said spacer fibres.

* * * * *